United States Patent
Kim et al.

(10) Patent No.: US 7,305,171 B2
(45) Date of Patent: Dec. 4, 2007

(54) APPARATUS FOR RECORDING AND/OR REPRODUCING DIGITAL DATA, SUCH AS AUDIO/VIDEO (A/V) DATA, AND CONTROL METHOD THEREOF

(75) Inventors: Kwang-jin Kim, Suwon (KR); Yeong-kyung Seong, Cheonan (KR); Tae-sun Choi, Gwangju (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 885 days.

(21) Appl. No.: 10/683,457

(22) Filed: Oct. 14, 2003

(65) Prior Publication Data

US 2004/0131331 A1    Jul. 8, 2004

(30) Foreign Application Priority Data

Oct. 14, 2002    (KR) .................. 10-2002-0062378

(51) Int. Cl.
*H04N 5/91* (2006.01)
*H04N 7/26* (2006.01)

(52) U.S. Cl. .................. 386/68; 386/52; 386/111; 386/112; 386/73

(58) Field of Classification Search .............. 386/69, 386/52, 111–112
See application file for complete search history.

(56) References Cited

U.S. PATENT DOCUMENTS 5,177,513 A * 1/1993 Saito .................. 352/129
5,982,979 A    11/1999 Yasuyuki et al.
2002/0110358 A1    8/2002 Green

FOREIGN PATENT DOCUMENTS

EP    0780844 A2    6/1997
WO    WO 9852356 A1    11/1998

* cited by examiner

*Primary Examiner*—Thai Q Tran
*Assistant Examiner*—Helen Shibru
(74) *Attorney, Agent, or Firm*—Roylance, Abrams, Berdo & Goodman, L.L.P.

(57) ABSTRACT

A digital data recording and/or reproducing apparatus and a control method thereof, In particular, the digital data recording and/or reproducing apparatus and method are capable of recording and reproducing an incoming digital broadcasting program in compressed format. The digital data recording and/or reproducing apparatus includes a controller for counting the number of forward motion compensation interpolated macro blocks and backward motion compensation interpolated macro blocks of a bidirectionally-predictive coded picture of a group of picture of the digital data, and detecting a point where a scene change occurs based on the counted number, and a video index generator for generating a video index by decoding an intraframe coded picture nearest to the detected point of scene change of each GOP, reproducing images and arranging the reproduced images. The navigation function is provided without requiring all the frames of the compressed broadcasting program to be decoded, but by detecting scene changes in the compressed region of the broadcasting program, and generates a video index of images of detected scene change points. Accordingly, a vast amount of multimedia data can be efficiently stored, and user friendliness is increased.

18 Claims, 4 Drawing Sheets

APPARATUS FOR RECORDING AND/OR REPRODUCING DIGITAL DATA, SUCH AS AUDIO/VIDEO (A/V) DATA, AND CONTROL METHOD THEREOF

This application claims benefit under 35 U.S.C. § 119 from Korean Patent Application No. 2002-62378, filed on Oct. 14, 2002, the entire content of which is incorporated herein by reference.

BACKGROUND OF THE INVENTION

1. Field of the Invention

The present invention relates to an apparatus for recording and/or reproducing data, such as digital audio/video (A/V) data, and a control method thereof. More particularly, the present invention relates to an apparatus for recording and/or reproducing data, such as digital A/V data, which detects a point of scene change for the purpose of searching the data received and stored therein, and generates navigation data using the detected point of scene change, and a control method thereof.

2. Description of the Related Art

Generally, a 'navigation' function of a data recording and/or reproducing apparatus, such as an A/V data recording and/or reproducing apparatus, refers to moving from a current data reproducing point to another point selected by a user and resuming reproducing from the user selected point, or rearranging the reproducing order of the recorded A/V data as desired by the user so that reproducing can be performed in the rearranged order. Accordingly, the 'navigation data' refers to additional information that is provided to realize the navigation function, and includes a data row temporal search table that contains information corresponding to the recording position of the A/V data and reproducing time for the corresponding A/V data, and a program table that contains reproducing order rearranging information preset by a manufacturer.

While reproducing the A/V data of the digital satellite broadcasting or the digital high resolution broadcasting from a 2-dimensional medium such as optical disc, it is the scene change information that is generally used for the function that enables the user to perform a search function to skip some scenes or jump to his desired scene and resume reproducing therefrom.

In particular, the scene change information is the information required for the reproducing process of the A/V data recording and/or reproducing apparatus that records/reproduces A/V data together with the navigation data. For example, one viewer can have all the TV programs of a certain broadcasting station of the previous day recorded on a single disc. Instead of watching all the recorded programs from the first one, the viewer may want to skip some parts of the program, and it is the scene change information that is required for such a situation.

The scene change information refers to the information about the pointer which points to a certain position of the entire region of the program. When the viewer inputs a command such as "search command" that requires skipping of some scenes in the forward or backward direction, the pointer moves from the position currently being reproduced to a new reproducing position requested by the viewer. The scene change information can be recorded according to several criteria.

One existing method for detecting a scene change from the recording medium for A/V content search is to perform a discrete cosine transformation (DCT) based on the complexity of the image in the pixel region, and detect the scene change based on the resultant information. The major shortcoming of this existing method is that it has quite great computational requirements for the sequential processes of decoding a compressed image in MPEG format, recovering the image, re-DCT computation, and detection of scene change in real time basis. Accordingly, it requires a system that has enough capability to handle the required computations.

As for the detection algorithm that segments the digital multimedia motion picture into plurality of meaningful parts, there mainly are two methods. One method is to use pixel data of reference image, and the other is to use motion compensation of an image frame. The simplest way is to use the difference between the pixel data of the two neighboring frames. That is, if the difference is determined to be equal to, or greater than a predetermined threshold, it is determined that there is scene change. Although this technique may be effective with respect to the picture that has relatively little motion, it has considerable errors for a picture that has much motion. The method to use motion compensation is more effective on these accounts. However, the shortcoming is that it has complex computational requirements for motion vectors of the respective frames. Although phase matching can be employed for this method, it requires many computations and memory to perform fast Fourier transform (FFT).

As described above, such complex computations required for the scene change detection hinder adaptation of the above method in a system of relatively low capacity, such as a satellite broadcasting receiver or the like.

SUMMARY OF THE INVENTION

Accordingly, it is an object of the present invention to provide an apparatus for recording and/or reproducing data, such as digital A/V data, which is capable of detecting a scene change point in a compression region and thus detecting the scene change point without requiring much computations, and a control method thereof.

Accordingly, the present invention has been made to solve the above-mentioned problems occurring in the conventional systems, and an aspect of the present invention is to provide a data recording and/or reproducing apparatus, such as a digital A/V data recording and/or reproducing apparatus, for recording and/or reproducing an incoming digital broadcasting program in compressed format. The apparatus includes a controller for counting the number of forward motion compensation interpolated macro blocks and backward motion compensation interpolated macro blocks of a bidirectionally-predictive coded picture of a group of picture (GOP) of the digital A/V data, and for detecting a point where a scene change occurs based on the counted number. The apparatus further comprises a video index generator for generating a video index by decoding an intraframe coded picture nearest to the detected point of scene change of each GOP, reproducing images and arranging the reproduced images.

Further provided are a recording medium including an data storing region that stores the digital data, such as digital A/V data, therein, a video index storing region that stores the video index therein, and a video index display for displaying the video index in which the reproduced images are arranged in a temporal order. The recovered images are minimized, and arranged in the form of an icon in a temporal order.

The controller detects a scene change in a first bidirectionally-predictive coded picture, upon determining that the number of backward motion compensation interpolated macro blocks of the first bidirectionally-predictive coded picture of the GOP, and the number of backward motion compensation interpolated macro blocks of a second bidirectionally-predictive coded picture of the GOP, are equal to or greater than a predetermined threshold. The controller detects a scene change in a second bidirectionally-predictive coded picture, when determining that the number of forward motion compensation interpolated macro blocks of the first bidirectionally-predictive coded picture of the GOP, and the number of backward motion compensation interpolated macro blocks of the second bidirectionally-predictive coded picture of the GOP, are equal to or greater than a predetermined threshold. The controller detects a scene change in an intraframe coded picture, or a intraframe forward predictive coded picture next to the second bidirectionally-predictive coded picture, when determining that the number of forward motion compensation interpolated macro blocks of a first bidirectionally-predictive coded picture of the GOP, and the number of forward motion compensation interpolated macro blocks of a second bidirectionally-predictive coded picture, are equal to or greater than a predetermined threshold.

The controller controls the apparatus so that the recorded digital broadcasting program can be reproduced from a selected position, when there is an input of a selection signal for selecting a predetermined image among the recovered images of the displayed video index.

Another embodiment of the present invention provides a control method for a digital data recording and/or reproducing apparatus, such as digital A/V data recording and/or reproducing apparatus that records and reproduces a digital broadcasting program. The method comprises the steps of dividing an incoming video program data into a plurality of groups of picture (GOP), counting the number of forward motion compensation interpolated macro blocks and the number of backward motion compensation interpolated macro blocks of a bidirectionally-predictive coded picture of each GOP, detecting a point where scene change occurs based on the counted number of forward and backward motion compensation interpolated macro blocks, and decoding an intraframe coded picture nearest to the frame where the scene change point is detected, thereby recovering images, and generating a video index in a manner such that the recovered images can be arranged in a temporal order.

The scene change point detecting step determines that there is a frame in the GOP having a scene change therein, upon determining that the number of motion compensation interpolated macro blocks is lower than a predetermined threshold. The scene change point detecting step determines that there is a frame in the GOP having a scene change therein, upon determining that a difference between the number of forward motion compensation interpolated macro blocks and the number of backward motion compensation interpolated macro blocks is greater than a predetermined threshold.

The scene change point detecting step determines that there is a scene change in a first bidirectionally-predictive coded picture of the GOP, upon determining that the number of backward motion compensation interpolated macro blocks of the first bidirectionally-predictive coded picture of the GOP, and the number of backward motion compensation interpolated macro blocks of a second bidirectionally-predictive coded picture of the GOP are equal to or greater than a predetermined threshold. The scene change point detecting step determines that there is a scene change in a second bidirectionally-predictive coded picture of the GOP, upon determining that the number of forward motion compensation interpolated macro blocks of a first bidirectionally-predictive coded picture of the GOP, and the number of backward motion compensation interpolated macro blocks of the second bidirectionally-predictive coded picture of the GOP are equal to or greater than a predetermined threshold. The scene change point detecting step determines that there is a scene change in an intraframe coded picture or a intraframe forward predictive coded picture next to a second bidirectionally-predictive coded picture of the GOP, upon determining that the number of forward motion compensation interpolated macro blocks of a first bidirectionally-predictive coded picture of the GOP, and the number of forward motion compensation interpolated macro blocks of the second bidirectionally-predictive coded picture of the GOP, are equal to or greater than a predetermined threshold.

The video index generating step generates a video index in a manner such that intraframe coded picture at the scene change points detected throughout the video program is decoded, reproduced, iconized and arranged.

The method further includes the step of displaying the video index in which the icons of the scene change points are arranged in a temporal order, upon receipt of a video index request signal. The recorded digital broadcasting program is reproduced from a selected position, when there is an input of a selection signal for selecting a predetermined image among the recovered images of the displayed video index. When there is an input of a skip signal during the reproducing of the digital broadcasting, the program is reproduced from a nearest icon of scene change point.

BRIEF DESCRIPTION OF THE DRAWINGS

The above objects and other features of the present invention will become more apparent by describing in detail a preferred embodiment thereof with reference to the attached drawings, in which.

DETAILED DESCRIPTION OF THE PREFERRED EMBODIMENTS

Hereinafter, certain embodiments of the present invention will be described in detail with reference to the accompanying drawings.

Figure 1:
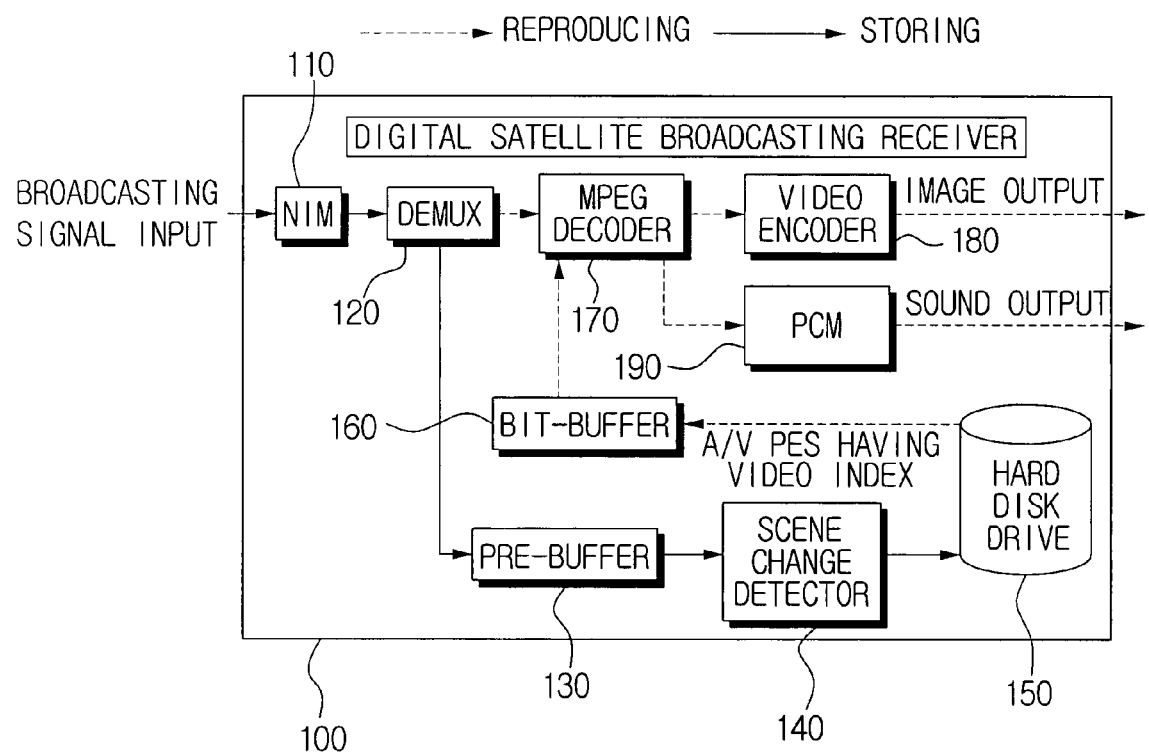
FIG. 1 is a block diagram of a digital broadcasting receiver according to an embodiment of the present invention.

FIG. 1 is a block diagram showing a digital broadcasting receiver, or a set top box, as a digital data recording and/or reproducing apparatus, such as a digital A/V data recording and/or reproducing apparatus according to the present invention by way of an example.

Referring to FIG. 1, the digital broadcasting receiver according to an embodiment of the present invention includes a network interface module (NIM) 110, a demultiplex (DEMUX) 120, a pre-buffer 130, a scene change detector 140, a recording medium, a MPEG decoder 170, a bit-buffer 160, a video encoder 180, and a pulse code modulator (PCM) 190.

The NIM 110 demodulates the program data received from the satellite into a digital signal. In this example, the digital signal is a complex of broadcasting programs from several channel. The DEMUX 120 selects the data of the program among the broadcasting programs according to the selection of the user, and transmits the selected data to the broadcasting receiver. If the user does not select to record his/her selected program, the selected program data is transmitted to the MPEG decoder 170, while if the use selects to record the program, the program data is temporarily stored in the pre-buffer 130. The data accumulated in the pre-buffer 130 is stored in the recording medium via the scene change detector 140. It is preferable to employ a hard disc 150 as the recording medium.

If the user inputs a reproduce command to reproduce the program stored in the hard disc 150, the program data is transmitted to the bit-buffer 160, and applied to the MPEG decoder 170. Then, the MPEG decoder 170 decodes the MPEG data, so that the video data of the decoded MPEG data is, via the video encoder 180, output to a screen of TV, while the audio data is output through the speaker via the PCM 190.

Figure 2:
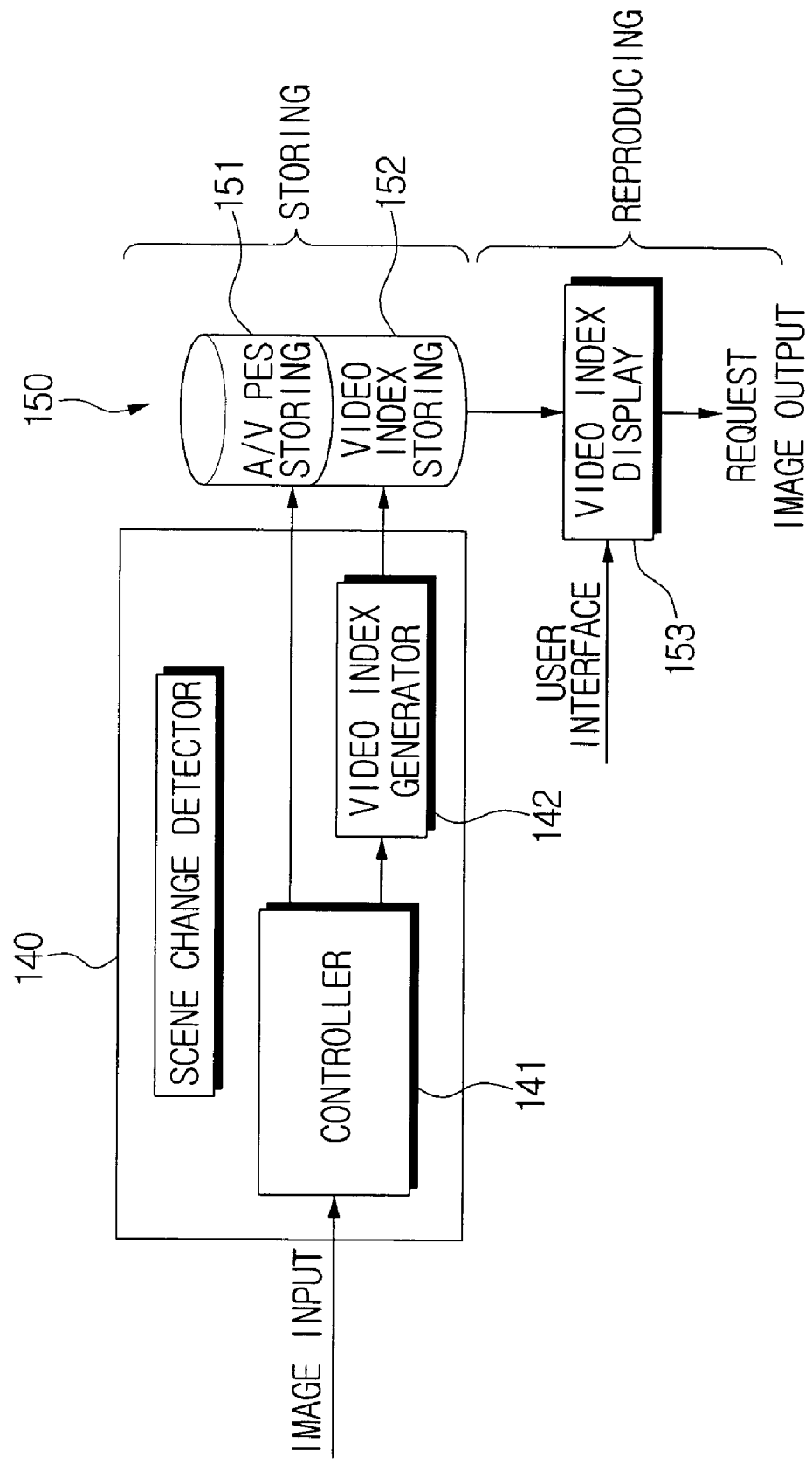
FIG. 2 is a block diagram of the scene change detector of FIG. 1.

Meanwhile, the scene change detector 140 generates a video index that consists of images of the points of the received broadcasting program where there are scene changes. The video index is one example of the navigation data for performing the navigation function. Referring now to FIG. 2, the scene change detector 140 includes a controller 141 that detects scene change points from the input video data, and a video index generator 142 that decodes the intraframe coded picture nearest to the detected scene change point and thus generates a video index in which reproduced images are arranged in a temporal order.

The hard disc 150, or the recording medium, includes an A/V data recording region 151 where the A/V data of the program past through the scene change detector 140 is recorded, and a video index storing region 152 where the video index generated at the video index generator 142 is stored.

When the video index request signal is input through a user interface, the video index stored in the video index storing region 152 is displayed on a video index display 153. It is preferable to display the video index in the form such that the images of the detected scene change points formed as icons are arranged in a temporal order. As for the video index display 153, a screen such as TV screen through which video data is output is employed.

The video index only shows the images of the points where scene change occurs, and accordingly, provides the user with information that effectively helps the user to perform the search.

Meanwhile, considering that the received broadcasting programs are all in compressed form in MPEG format, the detection of scene change points according to an embodiment of the present invention uses a macro block type of bidirectionally-predictive coded picture of the group of pictures (GOP), and does not decode all the frames.

The above will be described with reference to FIGS. 3A to 3C, which are schematic views that illustrate intraframe coded pictures, or intraframe forward predictive coded pictures and bidirectionally-predictive coded pictures of the GOP.

Figure 3A:
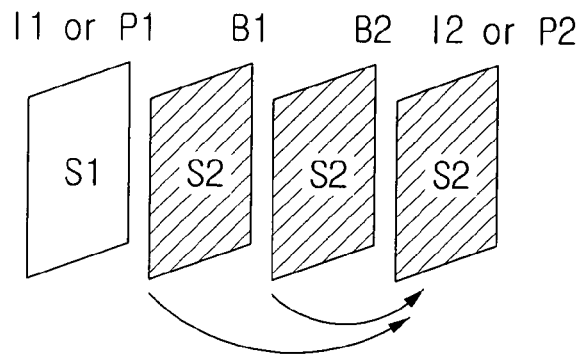
FIGS. 3A to 3C are schematic views showing the group of picture (GOP) of A/V data.
Figure 3B:
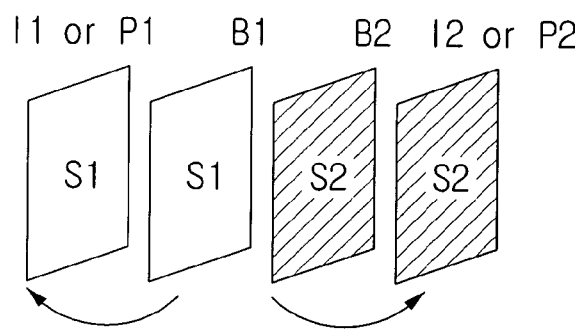
Figure 3C:
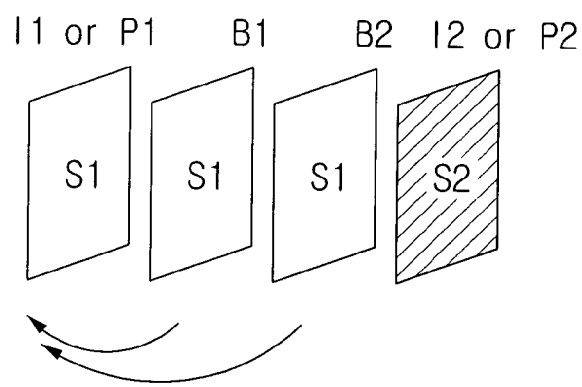

As shown in FIGS. 3A to 3C, there are mainly three cases that scene changes in certain parts of the GOP. S2 indicates the picture where scene change occurs.

First case is shown in FIG. 3A, where the scene changes in the first bidirectionally-predictive coded picture (B1). In this case, there are backward motion compensations. FIG. 3B shows the second case where scene change occurs in the second bidirectionally-predictive coded picture (B2). In this case, the motion compensation direction oppositely varies in front, and back of, the bidirectionally-predictive coded picture (B2) where the scene changes. The final, that is, the third case, is shown in FIG. 3C, where the scene change occurs in the intraframe coded picture (12) or intraframe forward predictive coded picture (P2) next to the second bidirectionally-predictive coded picture (B2). In this case, forward motion compensation is performed. As described, by using the macro block type information, the scene change points are detected.

Figure 4:
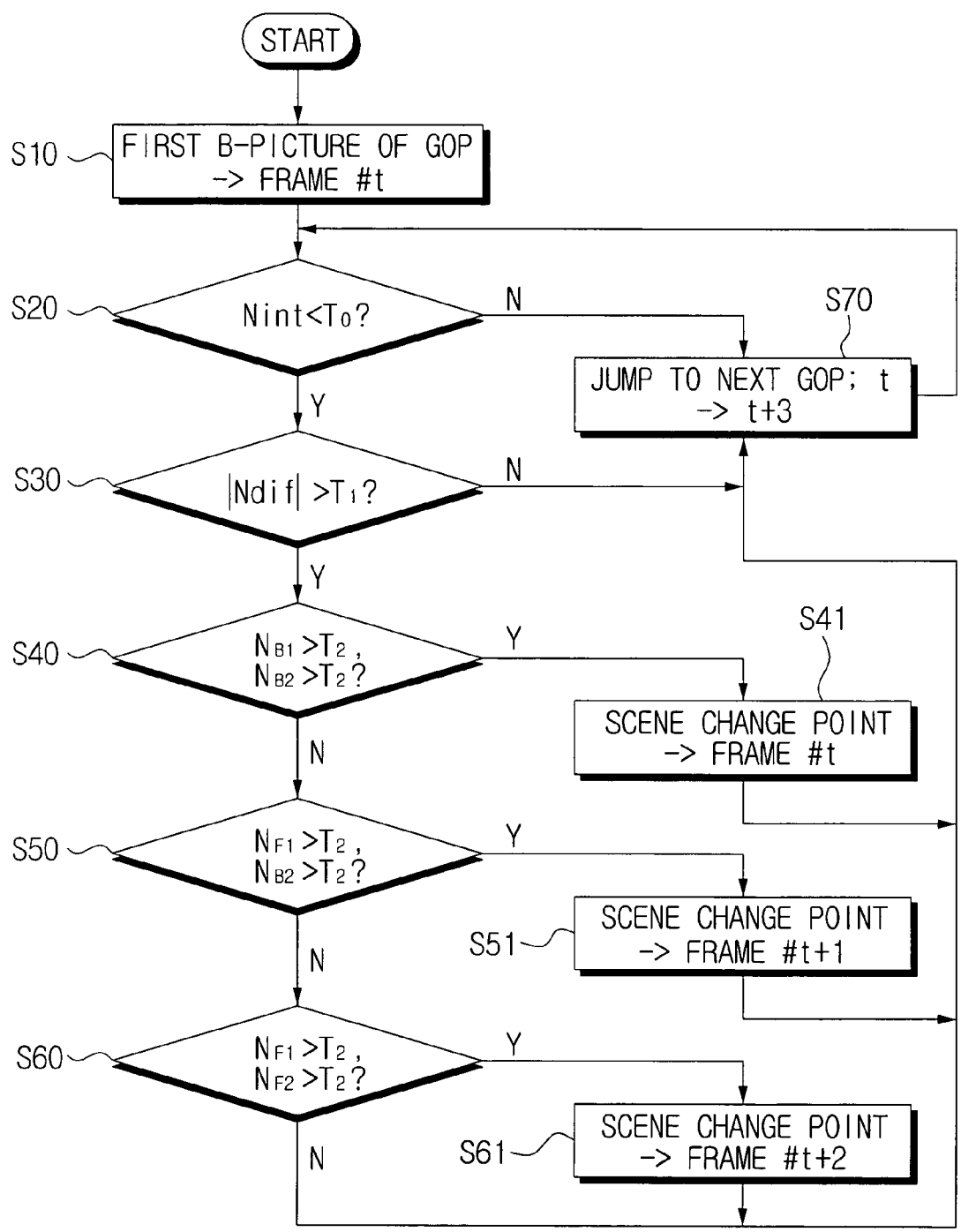
FIG. 4 is a flowchart illustrating a control method for the digital broadcasting receiver of FIG. 1.

FIG. 4 is the flowchart showing the scene change detection algorithm that detects the points of the scene change using the macro block type of the bidirectionally-predictive coded picture of the GOP. Using the scene change detection algorithm, processes of detecting scene change, indexing input images, and recording and reproducing the images are performed. These processes will be described below in detail with reference to FIGS. 1, 2 and 4.

First, the broadcasting signal is input through the NIM 110, and applied to the DEMUX 120, so that one among the multiplexed broadcasting programs is selected through the DEMUX 120 according to a user selection. If there is a recording command for the selected program, the program data is input to the scene change detector 140 via the pre-buffer 130.

Since the program data input to the scene change detector 140 is in compressed form in MPEG format, in order to simplify the computations for scene change points in the compressed region, the number Nint of the motion compensation interpolated macro blocks of the bidirectionally-predictive coded picture in GOP (Group of Picture) unit is counted.

The number of backward or forward interpolated macro blocks represents correlativity of the bidirectionally-predictive coded picture with the previous, or the next intraframe coded picture, or with the intraframe forward predictive coded picture. In other words, if the number Nint of the interpolated macro blocks is smaller than the predetermined threshold, is can be determined that there is scene change. Also, with the scene change in some part of the GOP, the motion compensation of the interpolated macro blocks is greater towards a certain direction, for example, it is greater backward, or greater forward. Accordingly, if the number $N_{int}$ of the interpolated macro blocks equals to, or lower than the threshold $T_0$, it is determined that the corresponding GOP contains scene change point in operation S20. If the difference $N_{dif}$ between the number of forward and backward motion compensation interpolated macro blocks equals to, or greater than a threshold $T_1$, it is determined that the scene changes in some part of the corresponding GOP in operation S30. $N_{int}$ equal to, or greater than $T_0$, or $N_{dif}$ equal to, or lower than $T_1$, indicates there are no scene changes in the corresponding GOP, and accordingly, scene change detection is performed on the next GOP in operation S70.

If the number $N_{B1}$ of backward motion compensation interpolated macro blocks of the first bidirectionally-predictive coded picture of the scene change-containing GOP, and the number $N_{B2}$ of backward motion compensation-interpolated macro blocks of the second bidirectionally-predictive coded picture of the scene change-containing GOP is equal to or greater than a threshold $T_2$ in operation S40, it indicates that backward motion compensations are greater in both of bidirectionally-predictive coded pictures. In other words, referring to the greater backward motion compensations in both bidirectionally-predictive coded pictures as shown in FIG. 3A, it can be determined that the scene change occurred in the first bidirectionally-predictive coded picture in operation S41. Assuming the first bidirectionally-predictive coded picture of the GOP to be a frame number 't', it can be determined that the scene changed in the frame number 't'.

If the number $N_{F1}$ of forward motion compensation interpolated macro blocks of the first bidirectionally-predictive coded picture is equal to or greater than the threshold $T_2$, and the number $N_{B2}$ of backward motion compensation interpolated macro blocks of the second bidirectionally-predictive coded picture is equal to or greater than the threshold $T_2$ in operation S50, it indicates that the forward motion compensation is greater in the first bidirectionally-predictive coded picture, while the backward motion compensation is greater in the second bidirectionally-predictive coded picture as shown in FIG. 3B. Since the forward motion compensation is greater in the first bidirectionally-predictive coded picture, and the backward motion compensation is greater in the second bidirectionally-predictive coded picture, it can be determined that the scene change occurred in the second bidirectionally-predictive coded picture in operation S51. In other words, the scene change is determined to have occurred in the frame number t+1.

If the number $N_{F1}$ of forward motion compensation interpolated macro blocks of the first bidirectionally-predictive coded picture is equal to or greater than the threshold $T_2$, and the number $N_{F2}$ of forward motion compensation interpolated macro blocks of the second bidirectionally-predictive coded picture is equal to or greater than the threshold $T_2$ in operation S60, the backward motion compensation is greater in both of the first and the second bidirectionally-predictive coded pictures. Accordingly, as shown in FIG. 3C, it can be determined that the scene change occurred in the intraframe coded picture or the intraframe forward predictive coded picture following the bidirectionally-predictive coded picture in operation S61. In other words, the scene change is determined to have been occurred in the frame number t+2.

As described above, the points of the scene changes of the entire program can be detected by detecting the scene change points of the respective GOPs. The detected scene change points are recorded in the header position information. That is, header type information is contained in the first 2-bit of the header position information, to indicate whether it is a scene change header, a picture header, or a GOP header. Using the header type information, the video index generator 142 generates video index. That is, the intraframe coded picture nearest to each scene change point is encoded so that the image of the scene change point can be recovered, and the recovered images are arranged in a temporal order. The recovered images are minimized into a form of an icon, and arranged in the icon form. The generated video index is stored in the video index storing region 152 of the hard disc 150, and the program data is stored in the A/V storing region 151.

The stored video index is displayed on the video index display 153 such as a screen, upon receipt of video index request signal input through a user interface. Viewing the recovered images of the video index arranged in the temporal order, the user locates the point where he/she wants to view, and thus selects the corresponding icon. As the selection signal is input, the controller 141 starts reproducing the program from the point selected by the user.

During the reproducing of the program, with the input of the forward skip—or fast forward—command, the reproducing is skipped from the current point to the next nearest image icon, and then resumed. Also, with the input of the backward skip—or rewind—command during the program reproducing, the reproducing is skipped from the current point to the previous nearest image icon, and then resumed. The skipping points of the image icons correspond to the number of inputs of skip signals. If there is an input of automatic search signal, the reproducing may be performed with skipping at the scene change points.

Reproducing of the program is performed as follows.

First, as the user inputs reproducing signal using the video index for a certain program recorded in the hard disc 150, program data stored in the A/V storing region 151 is read to the bit-buffer 160, and input to the MPEG decoder 170. The MPEG decoder 170 decodes the compressed MPEG data, so that the recovered A/V data are output to the TV screen and speaker respectively via the video encoder and the PCM.

The detection of scene change points, using the scene change detection algorithm according to an embodiment of the present invention was conducted with respect to a broadcasting stream compressed in MPEG-2 format and consisting of 3000 frames of 300 macro blocks and 320×240 in size. As a result of detection, 24 times of scene changes were detected while there were 26 scene changes actually happened, with an accuracy of 92.3% and 0 error.

According to an embodiment of the present invention, the navigation function is provided without requiring all the frames of the compressed broadcasting program to be decoded, but by detecting scene changes in the compressed region of the broadcasting program. Accordingly, without requiring high quality system and memory space for great computations, the scene changes are detected, and the scene change points detected in real time during the storage of the received programs can be stored together with the video index. A vast amount of multimedia data can be efficiently stored, and the user friendliness increases.

Although a few embodiments of the present invention have been described, it will be understood by those skilled in the art that the present invention should not be limited to the described embodiments, but various changes and modifications can be made within the spirit and scope of the present invention as defined by the appended claims.

What is claimed is:

1. A digital A/V data recording/reproducing apparatus for recording and reproducing an incoming digital broadcasting program in compressed format, comprising:
   a controller for counting the number of forward motion compensation interpolated macro blocks and backward motion compensation interpolated macro blocks of a B-picture of a group of picture (GOP) of the digital A/V data, and detecting a point where a scene change occurs based on the counted number being less than a predetermined value; and
   a video index generator for generating a video index by decoding an I-picture nearest to the detected point of scene change of each GOP, reproducing images and arranging the reproduced images.

2. The digital A/V data recording/reproducing apparatus of claim 1, further comprising a recording medium including an A/V data storing region that stores the digital A/V data therein, and a video index storing region that stores the video index therein.

3. The digital A/V data recording/reproducing apparatus of claim 1, further comprising a video index display for displaying the video index in which the reproduced images are arranged in a temporal order.

4. The digital A/V data recording/reproducing apparatus of claim 3, wherein the recovered images are minimized, and arranged in, the form of an icon.

5. The digital A/V data recording/reproducing apparatus of claim 1, wherein the controller detects a scene change in a first B-picture, upon determining that the number of backward motion compensation interpolated macro blocks of the first B-picture of the GOP, and the number of backward motion compensation interpolated macro blocks of a second B-picture of the GOP, are equal to or greater than a predetermined threshold.

6. The digital A/V data recording/reproducing apparatus of claim 1, wherein the controller detects a scene change in a second B-picture, when determining that the number of forward motion compensation interpolated macro blocks of the first B-picture of the GOP, and the number of backward motion compensation interpolated macro blocks of the second B-picture of the GOP, are equal to or greater than a predetermined threshold.

7. The digital A/V data recording/reproducing apparatus of claim 1, wherein the controller detects a scene change in an I-picture, or a P-picture next to a second B-picture, when determining that the number of forward motion compensation interpolated macro blocks of a first B-picture of the GOP, and the number of forward motion compensation interpolated macro blocks of a second B-picture, are equal to or greater than a predetermined threshold.

8. The digital A/V data recording/reproducing apparatus of claim 1, wherein the controller controls so that the recorded digital broadcasting program can be reproduced from a selected position, when there is an input of a selection signal for selecting a predetermined image among the recovered images of the displayed video index.

9. A control method for a digital A/V data recording/reproducing apparatus that records and reproduces a digital broadcasting program, comprising the steps of:
    dividing an incoming video program data into a plurality of groups of picture (GOP), and counting the number of forward motion compensation interpolated macro blocks and the number of backward motion compensation interpolated macro blocks of a B-picture of each GOP;
    detecting a point where scene change occurs based on the counted number of forward and backward motion compensation interpolated macro blocks being less than a predetermined value;
    decoding an I-picture nearest to the frame where the scene change point is detected, and thereby recovering images; and
    generating a video index in a manner such that the recovered images can be arranged in a temporal order.

10. The control method of claim 9, wherein the scene change point detecting step determines that there is a frame in the GOP having a scene change therein, upon determining that the number of motion compensation interpolated macro blocks is lower than a predetermined threshold.

11. The control method of claim 9, wherein the scene change point detecting step determines that there is a frame in the GOP having a scene change therein, upon determining that a difference between the number of forward motion compensation interpolated macro blocks and the number of backward motion compensation interpolated macro blocks is greater than a predetermined threshold.

12. The control method of claim 9, wherein the scene change point detecting step determines that there is a scene change in a first B-picture of the GOP, upon determining that the number of backward motion compensation interpolated macro blocks of the first B-picture of the GOP, and the number of backward motion compensation interpolated macro blocks of a second B-picture of the GOP, are equal to or greater than a predetermined threshold.

13. The control method of claim 9, wherein the scene change point detecting step determines that there is a scene change in a second B-picture of the GOP, upon determining that the number of forward motion compensation interpolated macro blocks of a first B-picture of the GOP, and the number of backward motion compensation interpolated macro blocks of the second B-picture of the GOP, are equal to or greater than a predetermined threshold.

14. The control method of claim 9, wherein, the scene change point detecting step determines that there is a scene change in an I-picture or a P-picture next to a second B-picture of the GOP, upon determining that the number of forward motion compensation interpolated macro blocks of a first B-picture of the GOP, and the number of forward motion compensation interpolated macro blocks of the second B-picture of the GOP, are equal to or greater than a predetermined threshold.

15. The control method of claim 9, wherein the video index generating step generates a video index in a manner such that I-picture at the scene change points detected throughout the video program is decoded, reproduced, iconized and arranged.

16. The control method of claim 15, further comprising the step of displaying the video index in which the icons of the scene change points are arranged in a temporal order, upon receipt of a video index request signal.

17. The control method of claim 16, wherein the recorded digital broadcasting program is reproduced from a selected position, when there is an input of a selection signal for selecting a predetermined image among the recovered images of the displayed video index.

18. The control method of claim 15, wherein, when there is an input of a skip signal during the reproducing of the digital broadcasting, the program is reproduced from a nearest icon of scene change point.

* * * * *